US010274592B2

(12) United States Patent
Guo (10) Patent No.: US 10,274,592 B2
(45) Date of Patent: Apr. 30, 2019

(54) SYSTEM AND METHOD FOR MULTI-USER TWO-WAY RANGING (71) Applicant: Northwestern University, Evanston, IL (US)

(72) Inventor: Dongning Guo, Chicago, IL (US)

(73) Assignee: Northwestern University, Evanston, IL (US)

( * ) Notice: Subject to any disclaimer, the term of this patent is extended or adjusted under 35 U.S.C. 154(b) by 173 days.

(21) Appl. No.: 15/485,326

(22) Filed: Apr. 12, 2017

(65) Prior Publication Data

US 2017/0299706 A1 Oct. 19, 2017

Related U.S. Application Data (60) Provisional application No. 62/321,932, filed on Apr. 13, 2016.

(51) Int. Cl.
*H04W 4/00* (2018.01)
*G01S 11/06* (2006.01)
*H04B 17/318* (2015.01)
*G01S 13/76* (2006.01)
*H04B 17/27* (2015.01)
*H04B 17/364* (2015.01)
*G01S 5/02* (2010.01)

(52) U.S. Cl.
CPC ............ *G01S 11/06* (2013.01); *G01S 13/767* (2013.01); *H04B 17/27* (2015.01); *H04B 17/318* (2015.01); *H04B 17/364* (2015.01); *G01S 5/0289* (2013.01)

(58) Field of Classification Search
None
See application file for complete search history.

(56) References Cited

U.S. PATENT DOCUMENTS 7,023,995 B2 * 4/2006 Olsson ................ H04L 63/0407
380/255
7,486,221 B2 * 2/2009 Meyers ................... G01S 7/006
342/60

(Continued)

OTHER PUBLICATIONS

International Search Report and Written Opinion mailed in PCT/US2017/027141, dated Jul. 5, 2017.

(Continued)

*Primary Examiner* — Tuan A Tran
(74) *Attorney, Agent, or Firm* — Bell & Manning, LLC (57) ABSTRACT A node in a wireless network includes a memory, transceiver, and processor operatively coupled to one another. The memory stores a signature of the node. The transceiver is configured to transmit, during an initial frame, the signature to one or more neighboring nodes, and receive, during the initial frame, a first signal that includes one or more signatures of the one or more neighboring nodes. The transceiver is also configured to transmit, during a repetition frame, a scrambled waveform of the first signal received during the initial frame, and receive, during the repetition frame, a second signal that includes a retransmission of signals received by the one or more neighboring nodes during the initial frame. The processor is configured to determine a distance from the node to each of the one or more neighboring nodes based at least in part on the first signal and the second signal.

20 Claims, 6 Drawing Sheets

(56) References Cited

U.S. PATENT DOCUMENTS

| | | | |
|---|---|---|---|
| 8,050,246 B2* | 11/2011 | Wala | H04L 5/1469 370/345 |
| 8,068,851 B2 | 11/2011 | Goldberg et al. | |
| 8,289,963 B2* | 10/2012 | Barcelo Arroyo | H04W 4/027 370/389 |
| 8,451,766 B2* | 5/2013 | Lee | H04W 64/00 370/252 |
| 8,675,629 B2* | 3/2014 | Yi | H04W 56/0045 370/347 |
| 8,848,565 B2* | 9/2014 | Curticapean | H04W 64/00 370/252 |
| 8,989,053 B1 | 3/2015 | Skaaksrud et al. | |
| 9,363,778 B2* | 6/2016 | Haartsen | H04W 56/00 |
| 9,578,459 B2* | 2/2017 | Do | H04W 4/023 |
| 9,713,103 B2* | 7/2017 | Qin | H04L 5/0041 |
| 9,730,179 B2* | 8/2017 | Aldana | H04L 5/0055 |
| 9,907,044 B2* | 2/2018 | Zhang | H04W 64/00 |
| 9,924,387 B2* | 3/2018 | Aldana | H04L 43/0864 |
| 10,057,832 B2* | 8/2018 | Zhang | H04L 5/0055 |
| 10,129,875 B2* | 11/2018 | Aldana | H04W 72/0446 |
| 10,142,781 B2* | 11/2018 | Vamaraju | H04L 5/0055 |
| 2006/0007863 A1 | 1/2006 | Naghian | |
| 2010/0302947 A1 | 12/2010 | Leppanen et al. | |
| 2012/0309417 A1 | 12/2012 | Blom et al. | |
| 2015/0156747 A1 | 6/2015 | Skaaksrud et al. | |
| 2016/0028533 A1* | 1/2016 | Kazmi | H04W 72/1278 370/296 |

OTHER PUBLICATIONS

Bartoletti et al., A Mathematical Model for Wideband Ranging, IEEE Journal of Selected Topics in Signal Processing, vol. 9, No. 2, Nov. 13, 2014, pp. 216-228.

Hightower et al., Location Systems for Ubiquitous Computing, IEEE Computer Society Press, Aug. 2001, pp. 57-66.

Gezici et al., Localization via Ultra-Wideband Radios: A look at positioning aspects of future sensor networks, IEEE Signal Processing Magazine, Jul. 2005, pp. 70-84.

Pahlavan et al., Indoor Geolocation Science and Technology, IEEE Communications Magazine, Feb. 2002, pp. 112-118.

Win et al., On the Robustness of Ultra-Wide Bandwidth Signals in Dense Multipath Environments, IEEE Communications Letters, vol. 2, No. 2, Feb. 1998, pp. 51-53.

Dardari et al., Threshold-Based Time-of-Arrival Estimators in UWB Dense Multipath Channels, IEEE Transactions on Communications, vol. 56, No. 8, Aug. 2008, pp. 1366-1378.

Molisch et al., A Comprehensive Standardized Model for Ultrawideband Propagation Channels, IEEE Transactions on Antennas and Propagation, vol. 54, No. 11, Nov. 2006, pp. 3151-3166.

Lee et al., Ranging in a Dense Multipath Environment Using an UWB Radio Link, IEEE Journal on Selected Areas in Communications, vol. 20, No. 9, Dec. 2002, pp. 1677-1683.

Dardari et al., Ranging With Ultrawide Bandwidth Signals in Multipath Environments, Proceedings of the IEEE, vol. 97, No. 2, Feb. 2009, pp. 404-426.

Shen et al., Fundamental Limits of Wideband Localization—Part I: A General Framework, IEEE Transactions on Information Theory, vol. 56, No. 10, Oct. 2010, pp. 4956-4980.

Win et al., Network Localization and Navigation via Cooperation, IEEE Communications Magazine, May 2011, pp. 56-62.

Fu et al., A New Ranging Method for OFDMA Systems, IEEE Transactions on Wireless Communications, vol. 6, No. 2, Feb. 2007, pp. 659-669.

Mahmoud et al., Initial Ranging for WiMAX (802.16e) OFDMA, Military Communications Conference, Oct. 23, 2006, pp. 1-7.

Choi et al., Achieving single channel, full duplex wireless communication, MobiCom, Sep. 20, 2010, pp. 1-12.

Duarte et al., Full-duplex wireless communications using off-the-shelf radios: Feasibility and first results, Asilomar Conference on Signals, Systems, and Components, Nov. 7, 2010, pp. 1558-1562.

Sabharwal et al., In-band Full-Duplex Wireless: Challenges and Opportunities, IEEE Journal on Selected Areas in Communications, vol. 32, No. 9, Sep. 2014, pp. 1637-1652.

Zhang et al., Virtual full duplex wireless broadcasting via compressed sensing, IEEE/ACM Transactions on Networking, vol. 22, No. 5, Oct. 2014, pp. 1659-1671.

Guo et al., Virtual full-duplex wireless communication via rapid on-off-division duplex, Forty-Eighth Annual Allerton Conference, Sep. 29, 2010, pp. 412-419.

* cited by examiner

| Frame Length (µs) | Average Neighbors (n = 200) | Average Neighbors (n = 300) |
|---|---|---|
| 0.5 | 5.5 | 5.3 |
| 0.75 | 5.9 | 5.8 |
| 1 | 6.4 | 6.4 |
| 1.5 | 6.9 | 6.9 |
| 2 | 7.3 | 7.1 |
| 5 | 8.4 | 8.4 |

Fig. 6

SYSTEM AND METHOD FOR MULTI-USER TWO-WAY RANGING

CROSS-REFERENCE TO RELATED APPLICATIONS

The present application claims the priority benefit of U.S. Provisional Patent App. No. 62/321,932 filed on Apr. 13, 2016, the entire disclosure of which is incorporated by reference herein.

GOVERNMENT LICENSE RIGHTS

This invention was made with government support under CCF1423040 awarded by the National Science Foundation. The government has certain rights in the invention.

BACKGROUND

Location awareness in a wireless network refers to the ability of nodes in the network to know their locations and/or the locations of neighboring nodes. Such location awareness, which is also referred to as ranging, is very important in networks where nodes have mobility, such as vehicular networks, navigation networks, mobile ad hoc networks, sensor networks, cellular networks, the Internet of Things networks, etc. The awareness of location can be used for a variety of different purposes and applications, including collision avoidance, ensuring adequate node coverage in a given area, proximity sensing, etc.

SUMMARY

An illustrative node in a wireless network includes a memory, a transceiver, and a processor operatively coupled to one another. The memory is configured to store a signature of the node. The transceiver is configured to transmit, during an initial frame, the signature of the node to one or more neighboring nodes, and receive, during the initial frame, a first signal that includes one or more signatures of the one or more neighboring nodes. The transceiver is also configured to transmit, during a repetition frame, the first signal received during the initial frame, and receive, during the repetition frame, a second signal that includes a retransmission of signals received by the one or more neighboring nodes during the initial frame. The processor is configured to determine a distance from the node to each of the one or more neighboring nodes based at least in part on the first signal and the second signal.

An illustrative method includes transmitting, by a transceiver of a node during an initial frame, a signature of the node to one or more neighboring nodes. The method also includes receiving, by the transceiver of the node during the initial frame, a first signal that includes one or more signatures of the one or more neighboring nodes. The method also includes transmitting, by the transceiver of the node during a repetition frame, the first signal received during the initial frame. The method also includes receiving, by the transceiver of the during the repetition frame, a second signal that includes a retransmission of signals received by the one or more neighboring nodes during the initial frame. The method further includes determining, by a processor of the node, a distance from the node to each of the one or more neighboring nodes based at least in part on the first signal and the second signal.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

DETAILED DESCRIPTION

Existing network localization techniques typically use sequential signaling schemes where one pair of nodes communicate to determine their distance at a time. Such sequential signaling schemes take a significant amount of time and result in a high ranging overhead in large networks where many nodes are within range of each other. As a result, existing techniques suffer from a lack of scalability. In addition, the problems of high overhead and time consumption in existing schemes are exacerbated in networks where the nodes are highly mobile because location awareness calculations are on-going.

Described herein are systems, methods, and logic that provide a highly scalable location awareness solution for wireless network applications. Specifically, the proposed location awareness solution allows all nodes in a network to have location awareness after just two frames of transmission. In the first frame of transmission, all nodes transmit their respective signatures and receive transmitted signatures (in the form of a superposed signal, assuming full duplexing) from all nodes in range. In the second frame of transmission, all nodes transmit what they have received in the first frame multiplied by a scrambling sequence, and this second set of transmissions is also received by all nodes in range as a superposed signal. By the end of the second frame, every node can estimate not only its distance to all nodes within range, but also the distances between neighboring nodes which are within range of each other. To make distance estimates between two nodes, one technique involves using the round trip time (RTT) to estimate delay between two nodes, from which distance can be determined. Another technique uses the received signal strength to estimate the delay between the two nodes. The proposed scheme is highly scalable, and has been validated using simulation.

Many of the multiuser ranging schemes described herein assume all nodes are capable of in-band full duplexing. Full duplexing, as used herein, refers to a node both transmitting and receiving on the same frequency band during the same time frame. In the past, the half duplex constraint of wireless communication was taken to be a fundamental limit. However recent research breakthroughs have shown that in-band full duplexing is viable in commercial wireless networks. For example, there are multiple proposed methods on how to achieve full duplexing using self-interference cancellation or virtual full duplexing using rapid-on-off. As it is not relevant to the schemes described herein, the specific method by which full duplex is achieved is not discussed further. Moreover, as discussed below, the proposed location awareness schemes can be used for localization purposes even if the nodes are half duplex.

The proposed schemes are shown to have lower costs than the traditional solutions. For example, to achieve similar performance to the proposed signaling scheme using a tradition solution, it takes about 19.2 microseconds to estimate one pairwise distance. Even in a moderate size network of 25 nodes, this traditional solution requires 11.52 milliseconds for all the nodes to obtain direct distance estimates to all other nodes. Conversely, in the same network, the solution proposed herein takes about 1 millisecond for all nodes to obtain estimates of every in range pairwise distance. The proposed scheme differs from existing ranging schemes by allowing nodes to also estimate the distances between neighboring nodes rather than just its own distance to a neighboring node. Additionally, the decrease in cost becomes potentially even greater for larger networks which is pivotal for future systems due to the node densities expected.

Figure 1:
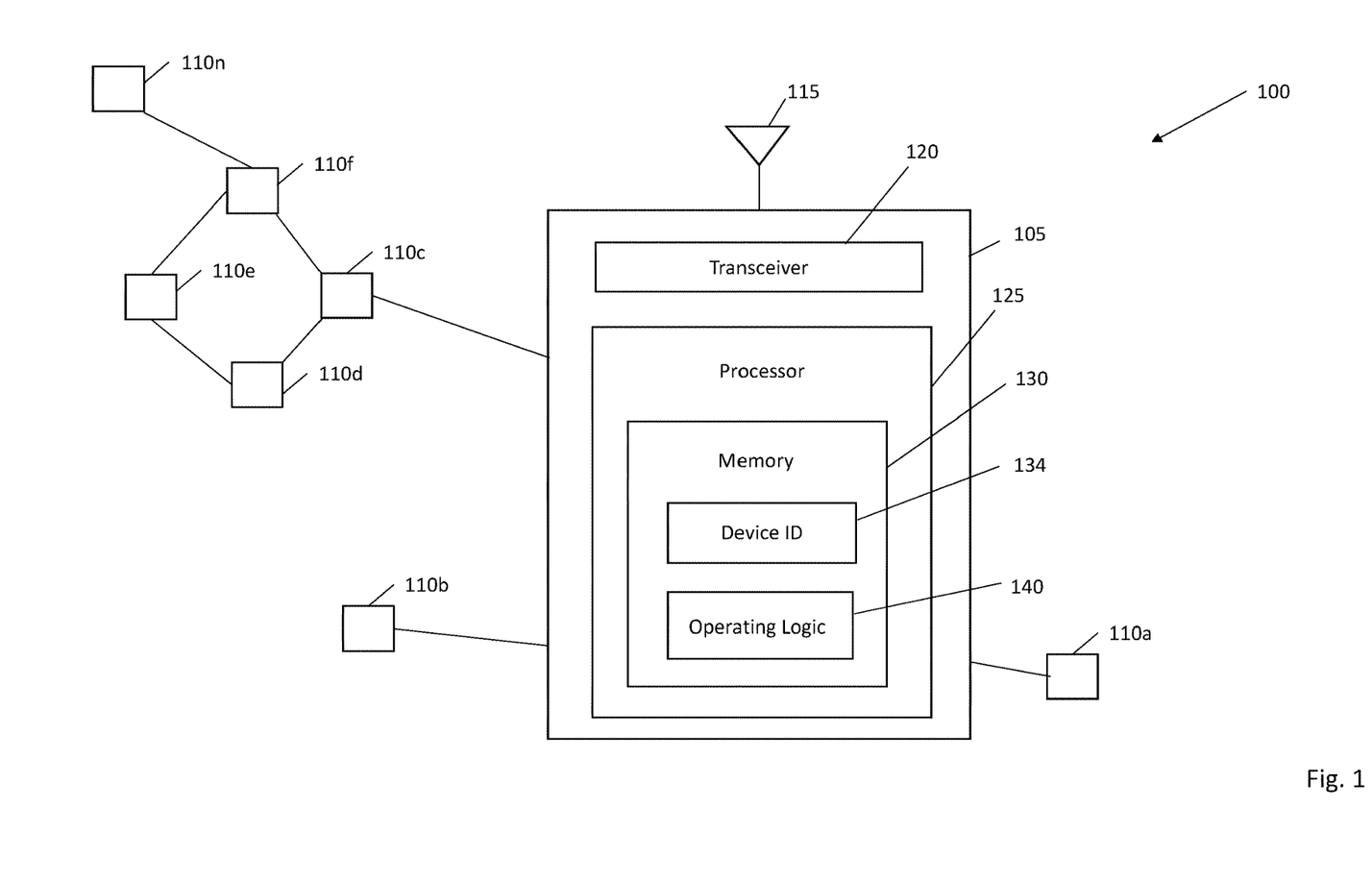
FIG. 1 is a block diagram of a wireless communications network in accordance with an illustrative embodiment.

FIG. 1 is a block diagram of a wireless communication network 100 in accordance with an illustrative embodiment. The wireless communication network 100 includes a communication device (or node) 105, which can be a mobile phone, a tablet, a personal digital assistant (PDA), a laptop computer, a desktop computer, a gaming device, a vehicle, a sensor, etc. In addition to communication device 105, the wireless communication network 100 also includes communications devices (or nodes) 110a-110n, where n can be any number of devices. As depicted in FIG. 1, the communication device 105 is in direct communication with communication devices 110a-110c, communication device 110c is in direct communication with communication devices 110d and 110f, the communication device 110e is in direct communication with communication devices 110d and 110f, and the communication device 110f is also in direct communication with the communication device 110n.

The communication device 105 includes an antenna 115, a transceiver 120, a processor 125, and a memory 130. It is to be understood that in practice, the communication device may include additional components such as a power source, a display or other user interface, a keyboard, etc. The communication devices 110a-110n can be the same as or different from the communication device 105, depending on the implementation.

The antenna 115 of the communication device 105 is configured to receive and transmit wireless signals, and is operatively coupled to the transceiver 120. The transceiver 120 allows the communication device 105 to formulate wireless transmissions, and to transmit/receive via the antenna 115. In an alternative embodiment, instead of a transceiver, the communication device 105 may include a separate transmitter and receiver. The processor 125 is operatively coupled to the transceiver 120 and to the memory 130, and is used to execute operating logic 140 stored in the memory 130. The processor 125 can be any type of processor known to those of skill in the art. The memory 130, which can be any type of memory/storage known to those of skill in the art, includes a device identifier (ID) 134 and the operating logic 140. The device identifier 134 can be a signature or other identifier which can be used to uniquely identify the communication device 105. The operating logic 140 can include computer-readable instructions which, upon execution by the processor 125, perform any of the operations described herein with respect to location awareness.

The wireless communication network 100 of FIG. 1 can be any type of wireless network, and may be used for tracking objects and/or people, military applications, vehicular applications, cellular communication, building monitoring, emergency location of accident or disaster victims, radio frequency identification (RFID) tag applications, inventory management, etc. The communication devices 105 and 110a-110n can communicate with one another via any wireless signal type, such as Radio Frequency (RF), InfraRed (IR), acoustic signal waveform (sonic and/or ultrasonic), visible light, and/or other varieties. In addition to wireless communication links/interfaces, some or all of the communication devices may also be equipped with wired communication links/interfaces. Communications between the communication devices of FIG. 1 can be direct and/or multi-hop, depending on the implementation.

A goal of the proposed scheme is for a given node to be able to compute the location of all nodes which the given node can reach in a network such as the communication network 100 of FIG. 1. Each of the n nodes (or communication devices) in a network is considered to have a respective position $x_1, \ldots x_n$, where $x_i \in \mathbb{R}^2$. In an illustrative embodiment, at least a portion of the n nodes are anchor nodes whose positions are known to all nodes in the network. If a node does not know the location of at least 3 anchor nodes within range, that node can communicate with other nodes to obtain their position information. Additionally, all of the n nodes are assumed to be capable of full duplexing. A half duplex embodiment of the proposed scheme is also discussed below.

For nodes i and j, the distance between them is denoted as $d_{ij}$. By convention, when there are two indices in a subscript herein (e.g., $\tau_{ij}$), the first index is the receiving node's index and the second index is the transmitting node's index. The propagation delay from node i to node j, which is denoted by $\tau_{ij}$, is equal to one half of the round trip time (RTT). This propagation delay can be used to directly compute the distance between the nodes due to the bijective nature of the two quantities. More specifically, the distance $d_{ij}$ between nodes i and j is related to the propagation delay as follows: $\tau_{ij} = \tau_{ji} = d_{ij}/c$, where c is the wave propagation velocity. Thus, the distance between nodes can be estimated based on the time that it takes to transmit a signal between the nodes.

Each node has its own internal clock with an associated oscillator. Different oscillators drift apart over time and this causes clock offsets between nodes. These clock offsets cause each node to have its own time axis, which may be different from the absolute time. The time axis differences are accounted for by adding the proper offsets to any signal. For example, let $\tau_i$ represent the clock offset (or delay) of node i from absolute time (the offset can be negative). To ease notation, the following relation is used:

$$\delta_{ji} = \tau_{ji} + \tau_i - \tau_j, \qquad \text{Eq. (1)}$$

which denotes the offset of node i as perceived at node j. In particular, if node i transmits a pulse at time t according to its own clock, node j receives the pulse at time $t+\delta_{ji}$ according to node j's own clock. It is assumed that the offset between all pairs of nodes within range of each other is upper bounded by some $\delta_{max}>0$, i.e., $|\delta_{ji}|<\delta_{max}$ for all i and j. For purposes of the present description, it is also assumed that there are no frequency differences in the clocks of different nodes and all signals are considered to be real valued.

For every j=1, . . . , n, node j transmits its signature $s_j(t)$, which has unit power spectral density (PSD) over its bandwidth, beginning at time zero according to its own time axis. It is assumed that all nodes know (or are able to determine) the signatures of all other nodes in the network. All the signatures of the various nodes are of identical length, referred to as the frame length $T>>\delta_{max}$. The signatures are chosen to be orthogonal or nearly orthogonal, and furthermore, for every j the autocorrelation function $\int_{-\infty}^{\infty} s_j(t) s_j(t+\delta) t$ vanishes quickly as $\delta$ deviates from 0. In an illustrative embodiment, the signature of a node can be a random sequence of Hi/Lo voltage values, where the random sequence includes, for example, 1000 values. Other sized sequences may also be used for the signature. The signature can be generated at a remote site and provided to the nodes. Alternatively, the signature can be determined by the node based on, for example, a node identifier of the node. Sufficient guard time is included in a frame to accommodate all signatures with offsets. The continuous-time received signal at node i (according to node i's time axis) can be written as:

$$y_i(t) = \sum_{j \in I_i} \sqrt{\gamma_{ij}} \, s_j(t - \delta_{ij}) + n_i(t),$$  Eq. (2)

where $I_i = \{1, \ldots n\} \setminus \{i\}$, $n_i(t)$ is an additive white Gaussian noise process with unit PSD, $\gamma_{ij}$ denotes the received signal-to-noise ratio (SNR) of node j's signal at node i, and $\sqrt{\gamma_{ij}}$ follows a log-normal distribution due to shadowing. It is assumed that all the signature and noise processes are independent.

The relative delays between the nodes, and therefore the distances between them, can be estimated using the received superposition of the delayed signatures. Without loss of generality, the problem faced by node i is to estimate delays $\delta_{ij}$ for all $j \in I_i$ based on the received signal $y_i(t)$ given by Eq. (2). One formulation of this estimation problem is:

$$\underset{\hat{\delta}_{ij}, \hat{\gamma}_{ij}, j \in I_i}{\text{minimize}} \int_{-\infty}^{\infty} \left( y_i(t) - \sum_{j \in I_i} \sqrt{\hat{\gamma}_{ij}} \, s_j(t - \hat{\delta}_{ij}) \right)^2 t$$  Eq. (3a)

subject to $-\delta_{max} \le \hat{\delta}_{ij} \le \delta_{max}, \ \forall j \in I_i$. Eq. (3b)

This optimization problem is difficult to solve directly. However, described herein is an algorithm using successive cancellation that can be used to solve the problem practically. In the successive cancellation algorithm, yet to be canceled signals are treated as white Gaussian noise. The algorithm can be written as follows:

1. Initialization: $r(t) \leftarrow y_i(t)$.
2. for j=1, . . . , n, j≠i, do
3. Estimate $\hat{\delta}_{ij}$ as the maximizer of the correlation of $s_j(t-\hat{\delta}_{ij})$ with r(t).
4. Estimate $\sqrt{\hat{\gamma}_{ij}}$ as the resulting correlation.
5. $r(t) \leftarrow r(t) - \sqrt{\hat{\gamma}_{ij}} s_j(t-\hat{\delta}_{ij})$.
6. end for The use of successive cancellation in this algorithm is not fundamental to delay and distance estimation. For example, an alternative algorithm could be designed which removes step 5 from the algorithm above. The proposed scheme is discussed below both without successive cancellation, and with successive cancellation.

A limiting factor of any one-way ranging delay estimation technique is the fact that the clock offsets may provide significant degradation to the estimates made. If the uncompensated relative clock offset $|\tau_i - \tau_j|$ is not much smaller than then it will cause the estimate to be in error as is the case in many practical systems. To account for these clock offsets, two-way ranging can be performed and the RTT is then estimated based on the following observation:

$$\delta_{ij} + \delta_{ji} = 2\tau_{ij}.$$  Eq. (4)

If the nodes and links form a connected planar network and every node is within range of at least three anchors, then triangulation is feasible. Once a node obtains all pairwise distances of nodes within its range, it can compute its own location by also using the known positions of the anchor nodes.

The two-frame signaling scheme used to perform ranging is discussed below in more detail. In the following discussion, the signatures sent by each node $s_i(t)$ for i=1, . . . , n, are considered to be independent Gaussian random processes with zero mean and unit PSD over their bandwidth of B Hz, and zero power elsewhere. Additionally, in the following discussion, signals are written according to the receiving node's time axis.

In the straightforward case of two nodes, each node transmits its signature during the initial frame and due to its full duplex capability the node also receives a transmitted signature from the other node at the same time (subject to propagation delay). Then each node repeats what it received in the initial frame during the repetition frame. At the same time during the repetition frame, the node receives the repetition from the other node, and therefore receives its own signal back. This allows for the RTT to be estimated from the perspective of each node.

Figure 2:
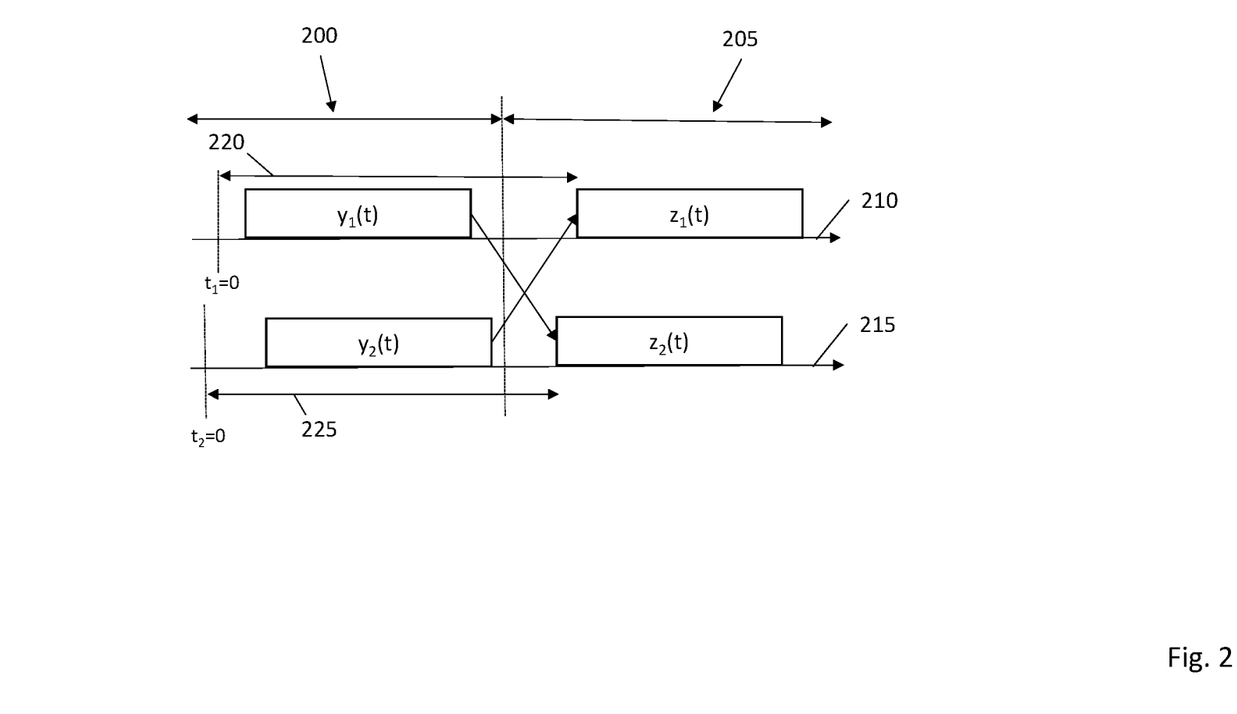
FIG. 2 is a diagram depicting an initial frame and a repetition frame for a two node network in accordance with an illustrative embodiment.

FIG. 2 is a diagram depicting an initial frame 200 and a repetition frame 205 for a two node network in accordance with an illustrative embodiment. The initial frame 200 of FIG. 2 shows the received signals at each of the two nodes according to its own time axis. A time axis 210 is the time axis of the first node, and a time axis 215 is the time axis of the second node. It can be seen that the time axes of the first and second nodes do not exactly line up due to the above-discussed clock offsets which are inherent in network devices using oscillators to keep time. In the initial frame 200, the first node receives a signal $y_1(t)$ (from the second node) and the second node receives a signal $y_2(t)$ (from the first node). In the repetition frame 205, the first node receives a signal $z_1(t)$, which is the transmission of $y_2(t)$ from the second node. Also in the repetition frame 205, the second node receives a signal $z_2(t)$, which is the transmission of $y_1(t)$ from the first node. The line 220 represents $RTT_1$ plus frame length, and the line 225 represents $RTT_2$ plus frame length.

For simplicity, the network is considered to be noiseless, and it is assumed that $\gamma_{ij}=1$ for all i, j. The signals received in the initial frame 200 can be written as:

$$y_1(t) = s_2(t - \delta_{12}), \text{ and}$$  Eq. (5)

$$y_2(t) = s_1(t - \delta_{21}).$$  Eq. (6)

The signals received during the repetition frame 205, which is shifted by one frame duration for simplicity, can be written as:

$$z_1(t)=y_2(t-\delta_{12}), \text{ and} \quad \text{Eq. (7)}$$

$$z_2(t)=y_1(t-\delta_{12}). \quad \text{Eq. (8)}$$

Combining Eqs. (5)-(8), it follows that:

$$z_1(t)=s_1(t-2\tau_{12}), \text{ and} \quad \text{Eq. (9)}$$

$$z_2(t)=s_2(t-2\tau_{12}). \quad \text{Eq. (10)}$$

This shows that the signals received in the repetition frame are only delayed by the RTT and do not depend on the clock offsets of the nodes. RTT estimates can then be made from $z_1(t)$ and $z_2(t)$ after only two frames.

A problem arises if one attempts to directly extend this signaling idea to the case of three or more nodes. Specifically, if a node receives multiple repetitions of its own signal in the second frame, the node cannot distinguish which copy came from which neighboring node. As a result, in cases with 3 or more nodes, the system is designed such that nodes scramble the initial frame that they receive before they repeat it. This scrambling process is described in the context of a three node system for simplicity. A scrambling waveform can be formed on the basis that $N=T0\theta B$ (this is assumed to be an integer value), $\Pi(t)$ is equal to 1 for $$0 \le t \le \frac{1}{\theta B}$$

and zero elsewhere (representing a rectangular pulse), and $b_i[k]$ is a discrete train of independent bipolar ($\pm 1$) pulses for $k=1, \ldots, N$. Each node can then have a scrambling waveform $b_i(t)$, which is defined as:

$$b_i(t) = \sum_{k=0}^{N} b_i[k]\Pi\left(t - \frac{k}{\theta B}\right). \quad \text{Eq. (11)}$$

In Eq. (11), $\theta \in (0,1)$ is a design parameter which controls the approximate bandwidth of the scrambling waveforms. All scrambling waveforms are assumed to be known by all nodes in the network.

In this three node case the received signals in the initial frame can be written as:

$$y_1(t)=s_2(t-\delta_{12})+s_3(t-\delta_{13}), \quad \text{Eq. (12)}$$

$$y_2(t)=s_1(t-\delta_{21})+s_3(t-\delta_{23}), \text{ and} \quad \text{Eq. (13)}$$

$$y_3(t)=s_2(t-\delta_{32})+s_1(t-\delta_{31}). \quad \text{Eq. (14)}$$

The received signals in the repetition frame then become:

$$z_1(t)=b_2(t-\delta_{12})y_2(t-\delta_{12})+b_3(t-\delta_{13})y_3(t-\delta_{13}), \quad \text{Eq. (15)}$$

$$z_2(t)=b_1(t-\delta_{21})y_1(t-\delta_{21})+b_3(t-\delta_{23})y_3(t-\delta_{23}), \text{ and} \quad \text{Eq. (16)}$$

$$z_3(t)=b_2(t-\delta_{32})y_2(t-\delta_{32})+b_1(t-\delta_{31})y_1(t-\delta_{31}). \quad \text{Eq. (17)}$$

Expanding $z_1(t)$ out it can be shown that:

$$z_1(t) = b_2(t-\delta_{12})s_1(t-2\tau_{12}) + b_3(t-\delta_{13})s_1(t-2\tau_{13}) + \quad \text{Eq. (18)}$$
$$b_2(t-\delta_{12})s_3(t-\delta_{23}-\delta_{12}) + b_3(t-\delta_{13})s_2(t-\delta_{32}-\delta_{13}).$$

It is apparent that node 1 receives multiple copies of $s_1(t)$, each of which is scrambled differently. After the initial and repetition frames have been transmitted and received at all nodes, the scheme moves into the estimation stage.

From $y_i(t)$ node i can obtain the relative delay estimate $\delta_{ij}$ for all $j \ne i$. Using the timing estimates from the initial frame, each node can descramble the signals from all other nodes it hears. The variable $r_{ij}(t)$ is used to denote the signal received by node i and descrambled using node j's scrambling waveform. The descrambled version of the signal received by node 1 can therefore be written as follows:

$$r_{12}(t) = b_2(t-\delta_{12})z_1(t) \quad \text{Eq. (19)}$$

$$= y_2(t-\delta_{12}) + b_2(t-\delta_{12})b_3(t-\delta_{13})y_3(t-\delta_{13}) \quad \text{Eq. (20)}$$

$$= s_1(t-2\tau_{12}) + s_3(t-\delta_{23}-\delta_{12}) + \quad \text{Eq. (21)}$$
$$b_2(t-\delta_{12})b_3(t-\delta_{13})y_3(t-\delta_{13})$$

It also follows that:

$$r_{13}(t)=s_1(t-2\tau_{13})+s_2(t-\delta_{32}-\delta_{13})b_3(t-\delta_{13})b_2(t-\delta_{12})y_2(t-\delta_{12}) \quad \text{Eq. (22)}$$

Based on the above equations, it then becomes straightforward to write the other descrambled signals. In an illustrative embodiment, the last term in Eqs. (21) and (22) can be treated as noise in order to make the desired estimates. This shows how in combination with the technique developed in the two node setting that each node can estimate the distance to all other nodes in its range within two frames. In fact, node 1 can estimate the distance between nodes 2 and 3, because it can calculate $\delta_{23}+\delta_{32}$ by estimating $\delta_{12}$, $\delta_{13}$, $\delta_{23}+\delta_{12}$, and $\delta_{32}+\delta_{13}$ from the received signals in Eqs. (12), (21), and (22). It is noted that scrambling increases the bandwidth of a signal. For example, the bandwidth of $z_i(t)$ in the repetition frame is approximately $(1+\theta)B$.

The preceding concepts discussed above in the context of 2 and 3 node networks can now be extended in a straightforward manner to a network of n nodes, with noise and channel gains included. Node i's received signals during the initial frame and repetition frame can be written as $y_i(t)$ given by Eq. (2) and $$z_i(t) = \sum_{j \in I_i} \sqrt{\gamma_{ij}} \, b_j(t-\delta_{ij})y_j(t-\delta_{ij}) + n_i'(t), \quad \text{Eq. (23)}$$

respectively, where $n_i'(t)$ is identically distributed as $n_i(t)$ and is independent of all signatures and other noise processes.

Any receiving node in the network is able to descramble the received signal using the scrambling waveforms and then use the descrambled signals to estimate the delays. The proposed two-frame signaling scheme thereby allows all nodes in a network to estimate all pairwise distances within the node's range.

Although the above discussion assumed that all nodes were capable of full duplex communications, the proposed ranging scheme does not inherently require full duplexing.

Under the half duplex constraint, the scheme can be modified slightly to still allow for much of the functionality using either frequency division or time division duplex. For example, there may be two non-overlapping frequency bands $f_1$ and $f_2$, and one half of the nodes belong to class A and the other half belong to class B. During the initial frame, the class A nodes transmit on frequency band $f_1$ and receive on frequency band $f_2$ while the class B nodes do the opposite. Then during the repetition frame the class A nodes transmit on frequency band $f_2$ and receive on frequency band $f_1$ while again the class B nodes do the opposite. Using this frequency division, class A nodes are still able to perform the ranging scheme with all class B nodes that are within range (similarly for class B nodes within range of class A nodes).

This modified half duplex scheme still allows for a node to estimate its distances to approximately half of the nodes that are within its range and obtain ranging estimates on any pair of nodes of the opposite class that are with its range. The half duplex scheme still does not require additional scheduling outside of the common two frames, while allowing for multiuser ranging to be used.

System Implementation without Successive Interference Cancellation

The ranging schemes described herein can be performed with or without successive interference cancellation. Included below is a discussion of schemes that do not use such successive interference cancellation. The variance of the delay estimates made in both the initial frame and the repetition frame are lower bounded, and the scaling properties of the bounds are analyzed with respect to the network size. For simplicity, the following scheme is adopted. After the initial frame, node i estimates $\hat{\delta}_{ij}$ for every $j \in l_i$. After the repetition frame, node i then estimates $\hat{\delta}_{ji}$ for every $j \in l_i$. All the interferences at the receiving node are treated as independent Gaussian noise.

A well known result in estimation theory is known as the Cramér-Rao lower bound (CRLB), and is stated below as Theorem 1.

Theorem 1: Let x be an N-point data set which depends on an unknown deterministic parameter $\theta$ where N is a positive integer. It is assumed that the PDF $p(x,\theta)$ satisfies the regularity condition that:

$$E\left[\frac{\partial \ln p(x, \theta)}{\partial \theta}\right] = 0 \quad \text{Eq. (24)}$$

for all $\theta$, where the expectation is taken with respect to $p(x,\theta)$. The variance of any unbiased estimate $\hat{\theta}$ must satisfy:

$$\operatorname{Var}(\hat{\theta}) \geq \frac{1}{-E\left[\frac{\partial^2 \ln p(x, \theta)}{\partial \theta^2}\right]}, \quad \text{Eq. (25)}$$

where the derivative is evaluated at the true value of $\theta$ and the expectation is taken with respect to $p(x,\theta)$.

Another established theorem, which can readily be proven, is as follows. Theorem 2: Let s(t) be a known signal which is zero for all $t \notin (0,T)$ with Fourier transform $S(\omega)$. The received signal model is given as $r(t) = s(t-\delta) + N(t)$, where $\delta$ is an unknown delay which is to be estimated, there exist finite M such that $0 \leq \delta \leq M$, and N(t) is a white Gaussian noise process with PSD $$\frac{N_0}{2}$$

for $\{t : 0 \leq t \leq T+M\}$. Let $$P_s = \frac{1}{T}\int_0^\infty s^2(t)dt$$

be the signal power and $$\beta = \left[\frac{1}{2\pi}\int_{-\infty}^{\infty}\omega^2|S(\omega)|^2 d\omega \bigg/ \frac{1}{2\pi}\int_{-\infty}^{\infty}|S(\omega)|^2 d\omega\right]^{\frac{1}{2}}$$

be the root-mean-square signal bandwidth. Based on r(t) for $t \notin (0, T+M)$, the variance of the estimated delay, $\hat{\delta}$, is lower bounded as:

$$\operatorname{Var}(\hat{\delta}) \geq \frac{1}{2T\beta^2} \cdot \frac{N_0}{P_s}. \quad \text{Eq. (26)}$$

Delay estimation errors are now discussed. From Eq. (2), it can be seen that the total additive noise plus interference process at node j while estimating the relative delay to node has a flat PSD equal to $1 + \sum_{k \in l_{i,j}} \gamma_{ik}$, where $l_{i,j} = \{1, \ldots, n\} \setminus \{i, j\}$. Using the CRLB, the variance of the initial frame estimates can be bounded.

Proposition 1: Assuming interference is treated as Gaussian noise, in the initial frame at node i the variance of the estimate for the relative delay to node j is lower bounded as:

$$\operatorname{Var}(\hat{\delta}_{ij}) \geq v_{ij} = \frac{12}{TB^3} \cdot \frac{1 + \sum_{k \in l_{i,j}} \gamma_{ik}}{\gamma_{ij}}, \quad \forall j \in l_i. \quad \text{Eq. (27)}$$

This proposition can readily be proven. It is next assumed that Eq. (27) is attainable in order to lower bound the variance of the estimates made in the repetition frame. This allows the system to provide a lower bound for the estimates in the repetition frame assuming the best case estimation in the initial frame. It is also known that the random variable $\hat{\delta}_{ij}$ can be treated as a Gaussian random variable with mean $\delta_{ij}$ and variance $v_{ij}$. After descrambling using node j's scrambling sequence at node i, it can be shown that:

$$b_j(t - \hat{\delta}_{ij})z_i(t) = b_j(t - \hat{\delta}_{ij})\left(\sum_{j \in l_i}\sqrt{\gamma_{ij}}\, b_j(t - \delta_{ij})y_j(t - \delta_{ij}) + n'_i(t)\right) \quad \text{Eq. (28)}$$

$$= \gamma_{ij}b_j(t - \hat{\delta}_{ij})b_j(t - \delta_{ij})s_i(t - 2\tau_{ij}) + \quad \text{Eq. (29)}$$

$$\sqrt{\gamma_{ij}}\, b_j(t - \hat{\delta}_{ij})b_j(t - \delta_{ij})$$

$$\left(\sum_{k \in l_{i,j}}\sqrt{\gamma_{jk}}\, s_k(t - \delta_{jk} - \delta_{ij}) + n_j(t - \delta_{ij})\right) +$$

$$b_j(t - \hat{\delta}_{ij})\sum_{k \in l_{i,j}}\sqrt{\gamma_{ik}}\, b_k(t - \delta_{ik})y_k(t - \delta_{ik}) +$$

$$b_j(t - \hat{\delta}_{ij})n_{i'}(t).$$

It can be seen from Eq. (29) that $b_j(t-\hat{\delta}_{ij})b_j(t-\delta_{ij})$ is an important term. This term is dependent upon the value of $\hat{\delta}_{ij}$, which is a random variable itself. The variable $\hat{\delta}_{ij}$ can be treated as a Gaussian random variable with mean $\delta_{ij}$ and variance equal to Eq. (27).

Proposition 2: Let $$\rho(x) = \text{erf}\left(\frac{1}{x}\right) - \frac{x}{\sqrt{\pi}}(1 - e^{-x^{-2}}). \quad \text{Eq. (30)}$$

Then the average autocorrelation function of the scrambling waveform can be expressed as $E[b_j(t-\hat{\delta}_{ij})b_j(t-\delta_{ij})]=\rho(\theta B\sqrt{2v_{ij}})$. This proposition can readily be proven. The following analysis is performed to determine the average behavior.

$$c(t) = \quad \text{Eq. (31)}$$
$$\gamma_{ij}\rho(\theta B\sqrt{2v_{ij}})s_i(t-2\tau_{ij}) + \gamma_{ij}(1-\rho(\theta B\sqrt{2v_{ij}}))s_i^p(t-2\tau_{ij}) +$$
$$\sqrt{\gamma_{ij}}\,\rho(\theta B\sqrt{2v_{ij}})\left(\sum_{k\in I_{i,j}} \sqrt{\gamma_{jk}}\,s_k(t-\delta_{jk}-\delta_{ij}) + n_j(t-\delta_{ij})\right) +$$
$$\sqrt{\gamma_{ij}}\,(1-\rho(\theta B\sqrt{2v_{ij}}))$$
$$\left(\sum_{k\in I_{i,j}} \sqrt{\gamma_{jk}}\,s_k^p(t-\delta_{jk}-\delta_{ij}) + n_j^p(t-\delta_{ij})\right) +$$
$$b_j(t-\hat{\delta}_{ij})\sum_{k\in I_{i,j}} \sqrt{\gamma_{ik}}\,b_k(t-\delta_{ik})y_k(t-\delta_{ik}) + b_j(t-\hat{\delta}_{ij})n_{i'}(t),$$

where $s_i^p(t-2\tau_{ij})$ is a scrambled version of $s_i(t-2\tau_{ij})$ (i.e., uncorrelated with $s_i(t)$). Next it is noted that this term, $c(t)$, can be broken down to a known signal of interest with a random delay and an interference plus noise term. Therefore, it follows that:

$$c(t) = f(t - 2\tau_{ij}) + w(t) \quad \text{Eq. (32)}$$
where
$$f(t - 2\tau_{ij}) = \gamma_{ij}\rho(\theta B\sqrt{2v_{ij}})s_i(t-2\tau_{ij}) \quad \text{Eq. (33)}$$
$$w(t) = \gamma_{ij}(1-\rho(\theta B\sqrt{2v_{ij}}))s_i^p(t-2\tau_{ij}) + b_j(t-\hat{\delta}_{ij})n_{i'}(t) + \quad \text{Eq. (34)}$$
$$\sqrt{\gamma_{ij}}\,\rho(\theta B\sqrt{2v_{ij}})\left(\sum_{k\in I_{i,j}} \sqrt{\gamma_{jk}}\,s_k(t-\delta_{jk}-\delta_{ij}) + n_j(t-\delta_{ij})\right) +$$
$$\sqrt{\gamma_{ij}}\,(1-\rho(\theta B\sqrt{2v_{ij}}))$$
$$\left(\sum_{k\in I_{i,j}} \sqrt{\gamma_{jk}}\,s_k^p(t-\delta_{jk}-\delta_{ij}) + n_j^p(t-\delta_{ij})\right) +$$
$$b_j(t-\hat{\delta}_{ij})\sum_{k\in I_{i,j}} \sqrt{\gamma_{ik}}\,b_k(t-\delta_{ik})y_k(t-\delta_{ik}).$$

It is noted that if $w(t)$ is treated as Gaussian noise that it has a non-flat spectrum and is therefore a colored Gaussian noise. A common practice in communication systems to deal with colored noise is to use a whitening process. Let $S_W(\omega)$ be the power spectral density of $w(t)$ and let $W(\omega)$ be the Fourier transform of $w(t)$. Then the whitening process is represented by applying a filter with power spectral density $$S_G(\omega) = \frac{1}{S_W(\omega)}.$$

The purpose of the whitening filter is to make the spectrum of the whitened interference plus noise term flat. The whitened received signal is then represented as:

$$c(t)*g(t) = f(t-2\tau_{ij})*g(t) + w(t)*g(t). \quad \text{Eq. (35)}$$

Therefore, there is a known signal $f(t-2\tau_{ij})*g(t)$ in Eq. (35) plus an uncorrelated white Gaussian noise. If $G(\omega)$ is the Fourier transform of $g(t)$, Theorem 2 can be used to state the following result as Proposition 3.

Proposition 3: Assuming the interference is treated as Gaussian noise and the scrambling process achieves sufficient de-correlation, then in the repetition frame after the whitening process the variance of the estimate of the delay made at node i is lower bounded as:

$$\text{Var}(\hat{\tau}_{ij}) \geq \frac{1}{4T_f \beta_f^2 P_f}, \quad \text{Eq. (36)}$$

for every $j\in I_j$. Where $$P_f = \frac{E_f}{T_f} = \frac{1}{T_f}\int_0^\infty (f(t)*g(t))^2 dt,$$

is the length of $f(t-2\tau_{ij})*g(t)$, $$\beta_f = \left[\frac{1}{2\pi}\int_{-\infty}^\infty \omega^2 |F(\omega)G(\omega)|^2 d\omega \bigg/ \frac{1}{2\pi}\int_{-\infty}^\infty |F(\omega)G(\omega)|^2 d\omega\right]^{\frac{1}{2}},$$

and $F(\omega)$ is the Fourier transform of $f(t)$.

Proposition 3 can readily be proven. When Gaussian signatures are used and all interferences are treated as white Gaussian noise, Eqs. (27) and (36) are in general a good approximation for the minimum mean square errors for $\delta_{ij}$ and $\tau_{ij}$, respectively.

Further, while Proposition 3 provides a computable bound, a more straightforward formula based on key system design parameters is also desirable. When $\theta$ is small enough then an approximation can be made in calculating $P_f$ and $\beta_f$, in accordance with Corollary 1.

Corollary 1: Assuming that $\theta$ is small enough such that for $\omega\in[-2\pi B, 2\pi B]$ that both $$\Pi\left(\frac{\omega}{4\pi B}\right)*\text{sinc}^2\left(\frac{\omega}{2\pi\theta B}\right) \text{ and } \Pi\left(\frac{\omega}{4\pi B}\right)*\text{sinc}^2\left(\frac{\omega}{2\pi\theta B}\right)*\text{sinc}^2\left(\frac{\omega}{2\pi\theta B}\right)$$

are approximately flat (i.e., constant) then Eq. (36) simplifies to $$\text{Var}(\hat{\tau}_{ij}) \geq \frac{3}{32\pi^2 B^3 SINR\, T}. \quad \text{Eq. (37)}$$

where $$SINR = \frac{\gamma_{ij}^2 \rho^2(\theta B\sqrt{2v_{ij}})}{\gamma_{ij}\left(1 + \sum_{k \in l_{ij}} \gamma_{jk}\right) + \gamma_{ij}\left(1 - \rho(\theta B\sqrt{2v_{ij}})\right)^2 \left(1 + \sum_{k \in l_i} \gamma_{jk}\right) +} \quad \text{Eq. (38)}$$
$$1 + \sum_{k \in l_{i,j}} \gamma_{ik} \sum_{l \in l_k} \gamma_{kl}$$

A key property of the proposed schemes is the scalability with the size of the network. To analyze the scalability, it is assumed that there exist positive constants a∈(0,1) and γ such that aγ≤$\gamma_{ij}$≤γ for all i, j. It is also assumed that T=n$T_0$ so that the frame length increases linearly with n. Next, $v_1$ is taken for the lower bound on Var($\hat{\delta}_{ij}$) and $v_2$ is taken as the lower bound on Var($\hat{\tau}_{ij}$). Assuming n≫1 and nγ≫1, it is shown that:

$$v_1 \approx \frac{12}{aT_0B^3}, \text{ and} \quad \text{Eq. (39)}$$

$$v_2 \approx \frac{3n}{32\rho^2(\theta B\sqrt{2v_1})a^2\pi^2B^3T_0}. \quad \text{Eq. (40)}$$

Note that if $T_0B$≫1, then ρ(θB$\sqrt{2v_1}$)≈1. It is evident that Eq. (40) grows with n, while the initial frame estimates are not limiting in this system. This shows that, even under the most basic estimation scheme, the scaling is on the same order as traditional methods of ranging and therefore the proposed two-frame scheme cannot scale any worse than traditional methods.

System Implementation with Successive Interference Cancellation (SIC)

In the discussion above, a one-shot estimation of a delay between two nodes has been considered. In a practical system, using this method to estimate all desired delays could potentially lead to unnecessarily large resource allocation as it would be limited by the node with the lowest signal-to-noise-plus-interference ratio (SINR). Such a result can be avoided by using SIC in addition to the proposed estimation scheme. To use SIC, a node which is performing estimations to multiple nodes first estimates the delay to the node with the highest received SINR and then attempts to cancel that signal from its overall received signal. The error term associated with this cancellation is given by:

$$e_{ih}(t) = \gamma_{ih}b_h(t-\delta_{ih})s_i(t-2\tau_{ih}) - \hat{\gamma}_{ih}b_h(t-\hat{\delta}_{ih})s_i(t-2\hat{\tau}_{ih}), \quad \text{Eq. (41)}$$

where $\hat{\gamma}_{ih}$ is the estimated signal amplitude from node h at node i. It is also noted that $e_{ih}(t)$ can be treated as a Gaussian interference term for subsequent estimations.

The amplitude estimation of a known signal with a random amplitude has been studied and it is known that using a matched filter while sampling at the correct time is the optimal way to estimate the signal amplitude in additive white Gaussian noise. For example, let s(t) be a known signal of unit power on (0,T), A be a random amplitude, and n(t) be additive Gaussian noise with PSD equal to $$\frac{N_0}{2}.$$

If the received signal model is y(t)=As(t)+n(t) then the simple estimate $\hat{A}=\int_0^T y(t)s(t)t$ satisfies $$\text{Var}(\hat{A}) = \frac{N_0}{2}. \quad \text{Eq. (42)}$$

While this theorem is technically used in the case when the time of arrival is known, it is a well known result that using a matched filter for the case when both the time of arrival and amplitude are unknown is still optimal. The amplitude estimate should be made at the time when the matched filter is at its peak. Following similar logic, the following proposition results.

Proposition 4: Assuming interference is treated as Gaussian noise, in the initial frame at node i the variance of the estimate for the received amplitude of node j's signal is lower bounded as:

$$\text{Var}(\sqrt{\hat{\gamma}_{ij}}) \geq \frac{1 + \sum_{k \in l_{i,j}} \gamma_{ik}}{\gamma_{ij}}, \forall j \in l_i. \quad \text{Eq. (43)}$$

This proposition can be readily proven. For purposes of ranging, the amplitude only needs to be estimated in the initial frame. This is due to the assumption that the coherence time of the channel is much longer than the frame length and the reciprocity of the channel. This is beneficial for the practical implementation of the proposed scheme. The main benefit being that there is less interference during the initial frame, leading to higher quality estimates. Additionally, this allows a node to determine which nodes are its nearest neighbors (in the sense of which are the strongest received signals).

Now that amplitude estimation has been considered, the following discussion covers the effect of SIC on delay estimation. In order to analyze how SIC will effect subsequent delay estimates, one can consider the situation where node i first estimates the delay to node h, cancels the signal from node h out, and then wishes to estimate the delay to node j. In such a scenario, Eq. (32) can be written as:

$$c'(t) = f(t - 2\tau_{ij}) + w'(t), \quad \text{Eq. (44)}$$
where $$w'(t) = \gamma_{ij}\left(1 - \rho(\theta B\sqrt{2v_{ij}})\right)s_i^p(t - 2\tau_{ij}) + \quad \text{Eq. (45)}$$
$$\sqrt{\gamma_{ij}}\,\rho(\theta B\sqrt{2v_{ij}})\left(\sum_{k \in l_{i,j}} \sqrt{\gamma_{jk}}\,s_k(t - \delta_{jk} - \delta_{ij}) + n_j(t - \delta_{ij})\right) +$$
$$\sqrt{\gamma_{ij}}\,(1 - \rho(\theta B\sqrt{2v_{ij}}))$$
$$\left(\sum_{k \in l_{i,j}} \sqrt{\gamma_{jk}}\,s_k^p(t - \delta_{jk} - \delta_{ij}) + n_j^p(t - \delta_{ij})\right) +$$
$$b_j(t - \hat{\delta}_{ij})\sum_{k \in l_{i,j,h}} \sqrt{\gamma_{ik}}\,b_k(t - \delta_{ik})y_k(t - \delta_{ik}) + b_j(t - \hat{\delta}_{ij})n_{i'}(t) +$$
$$b_j(t - \hat{\delta}_{ij})\sqrt{\gamma_{ih}}\,b_h(t - \delta_{ih})\sum_{w \in l_{i,h}} \sqrt{\gamma_{hw}}\,s_w(t - \delta_{ih} - \delta_{hw}) +$$
$$b_j(t - \hat{\delta}_{ij})e_{ih}(t),$$

and f(t−2$\tau_{ij}$) is as defined in Eq. (33). It is therefore important to quantify the power of $e_{ih}(t)$ which is defined as $E_{ih}$.

Since $e_{ih}(t)$ is treated as a Gaussian noise term, it is desirable to find its statistics, which can be done using Proposition 5 below. Let $v_{\tau_{ih}}$=Var($\hat{\tau}_{ih}$).

Proposition 5: Assuming that θ is small enough, then $e_{ih}(t)$ is approximately Gaussian with zero mean and PSD equal to $E_{ih}$ defined below, over the signal bandwidth B and zero elsewhere.

$$E_{ih} = 2\gamma_{ih}^2 \left(1 - \rho\left(\theta B \sqrt{v_{ih}}\right) \mu_{ih}\right) + \text{Var}(\hat{\gamma}_{ih}), \quad \text{Eq. (46)}$$

where $$\mu_{ih} = \frac{1}{\sqrt{2\pi v_{\tau_{ih}}}}. \quad \text{Eq. (47)}$$

This proposition can be readily proven. Next, the same steps described above (in the discussion of the system without SIC) are used to arrive at the corollary below.

Corollary 2: Assume that at node i the delay from node h is estimated, SIC is performed to attempt to cancel the signal from node h, and then node i wishes to estimate the delay to node j. Assuming that θ is small enough such that for $\omega \in [-2\pi B, 2\pi B]$ both $$\Pi\left(\frac{\omega}{4\pi B}\right) * \text{sinc}^2\left(\frac{\omega}{2\pi \theta B}\right) \text{ and } \Pi\left(\frac{\omega}{4\pi B}\right) * \text{sinc}^2\left(\frac{\omega}{2\pi \theta B}\right) * \text{sinc}^2\left(\frac{\omega}{2\pi \theta B}\right)$$

are approximately flat, then it follows that:

$$\text{Var}(\hat{\tau}_{ij}) \geq \frac{3}{32\pi^2 B^3 SINR'T}, \text{ where} \quad \text{Eq. (48)}$$

$$SINR' = \frac{\gamma_{ij}^2 \rho^2 \left(\theta B \sqrt{2v_{ij}}\right)}{N_{ij}^h}, \text{ and} \quad \text{Eq. (49)}$$

$$N_{ij}^h = \gamma_{ij}\left(1 + \sum_{k \in l_{i,j}} \gamma_{jk}\right) + \gamma_{ij}\left(1 - \rho\left(\theta B \sqrt{2v_{ij}}\right)\right)^2 \left(1 + \sum_{k \in l_i} \gamma_{jk}\right) + \quad \text{Eq. (50)}$$
$$1 + \sum_{k \in l_{i,j,h}} \gamma_{ik} \sum_{l \in l_k} \gamma_{kl} + \gamma_{ih} \sum_{l \in l_{h,i}} \gamma_{hl} + E_{ih}.$$

The same basic logic used to arrive at Corollary 1 can be used in order to get this result. It is apparent that this result can also be easily generalized to include the case where more than one signal has been canceled out prior to the estimation.

Figure 3:
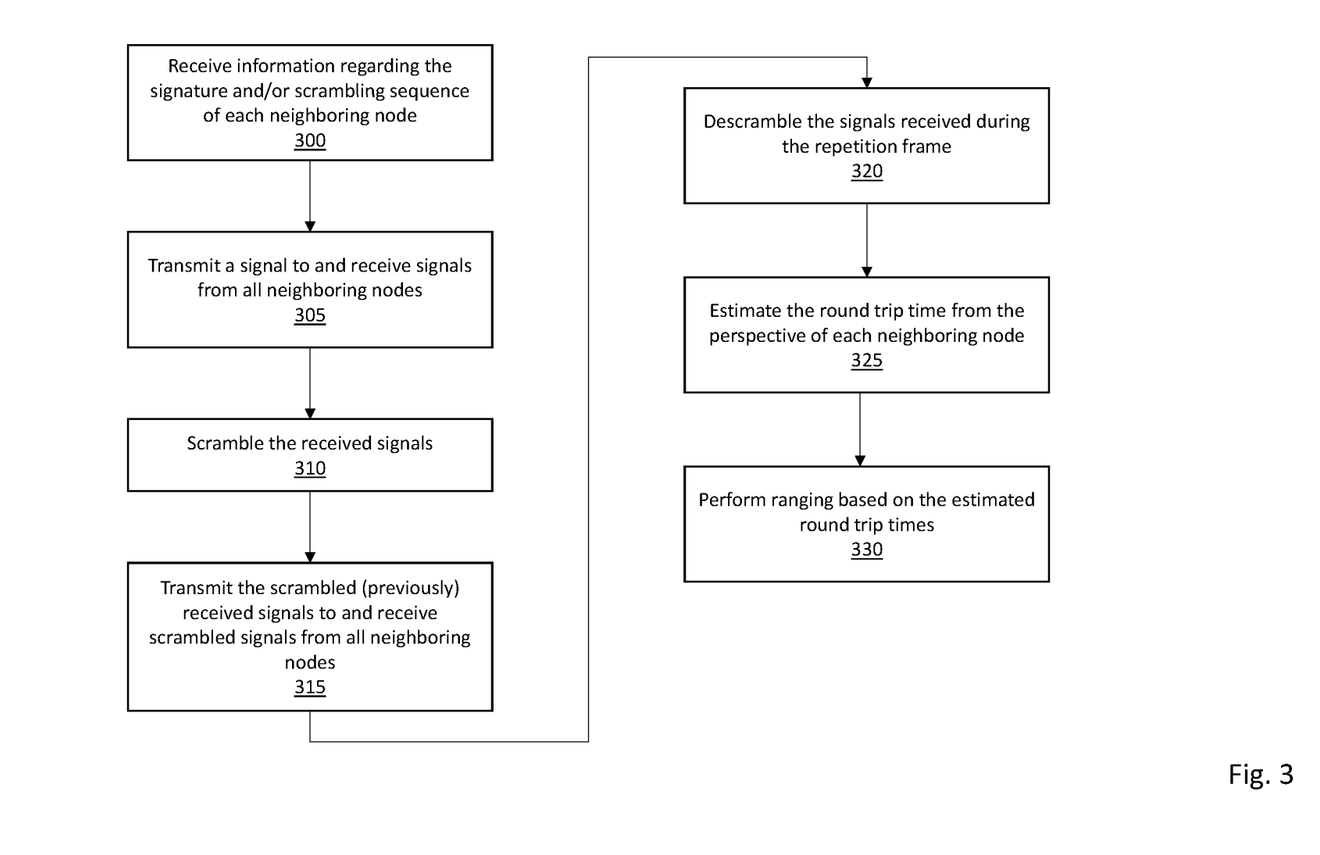
FIG. 3 is a flow diagram depicting operations performed by a two-way ranging system in accordance with an illustrative embodiment.

FIG. 3 is a flow diagram depicting operations performed by a two-way ranging system in accordance with an illustrative embodiment. In alternative embodiments, fewer, additional, and/or different operations may be performed. Also, the use of a flow diagram is not meant to be limiting with respect to the order of operations performed. The operations of FIG. 3 are described with reference to a node n, which is a full duplex node. In an operation 300, the node n receives information regarding the signature and/or scrambling sequence for each neighboring node. In one embodiment, the information can be an actual signature and an actual scrambling sequence for each neighboring node. The information can alternatively be a node identifier or other information regarding each node, which can be used by the node n to determine the signature and/or scrambling sequence for each neighboring node. In an illustrative embodiment, the operation 300 is performed during a discovery process in the network.

In an operation 305, which corresponds to an initial (or first) frame, the node n transmits a signal to all nodes in range and (substantially) simultaneously receives signals from all nodes in range. The transmitted and received signals can include respective node signatures, as discussed above. In an operation 310, the node n scrambles the signals received in operation 305. The scrambling can be performed using a scrambling waveform as discussed herein. In an operation 315, which corresponds to a repetition (or second) frame, the node n transmits the signals it received from operation 305 to all nodes in range, and (substantially) simultaneously receives transmissions from all nodes in range, where the received transmissions are scrambled retransmissions of the signals received by the neighboring nodes during the initial frame.

In an operation 320, the node n descrambles the received signals from each node that were received in the repetition frame of operation 315. In an operation 325, the node n runs an estimation algorithm based on the descrambled data to estimate the round trip time from the perspective of each of the neighboring nodes. As discussed herein, the RTT can be determined with or without the use of successive interference cancellation. In an operation 330, the node n performs ranging based on the round trip times estimated in the operation 325.

In an alternative embodiment, received signal strength (RSS) may be used instead of RTT to perform ranging between nodes. An advantage of using RSS is that ranging can be performed in just a single frame, instead of two frames. For example, each node in a full duplex system can transmit its signature to neighboring nodes and (substantially) simultaneously receive the signatures from its neighboring nodes. The nodes can then determine the RSS of the received signals using established techniques such as the amplitude determination discussed herein, and perform ranging based on the determined RSS of the received signals. A disadvantage of using RSS is that the transmit power of various nodes is typically not precisely known, and determinations based on RSS may not be as accurate due to path loss and other difficult to control parameters.

Simulation Results

Sample level simulations were conducted to test the performance of the scheme proposed herein. Analog signals were approximated using sufficient samples in discrete time. A network was simulated with one node at the center of a circular area being used as a typical case node, with other nodes being uniformly dropped within the area around the center node. A log normal distribution is used for the received amplitudes, and other pertinent parameters for the simulations include a signal bandwidth of 1 Gigahertz, an area radius of 300 meters, a sampling rate of 5 Gigasamples per second (Gs/s), and a minimum node distance of 1 meter. In alternative embodiments, different parameters may be used. Clocks are allowed to have offsets within the specified range of the parameters, but are assumed to have no frequency offsets. A modest minimum distance between nodes, i.e., 1 meter, is assumed in the simulations in order to prevent nodes from being almost completely co-located.

Figure 4:
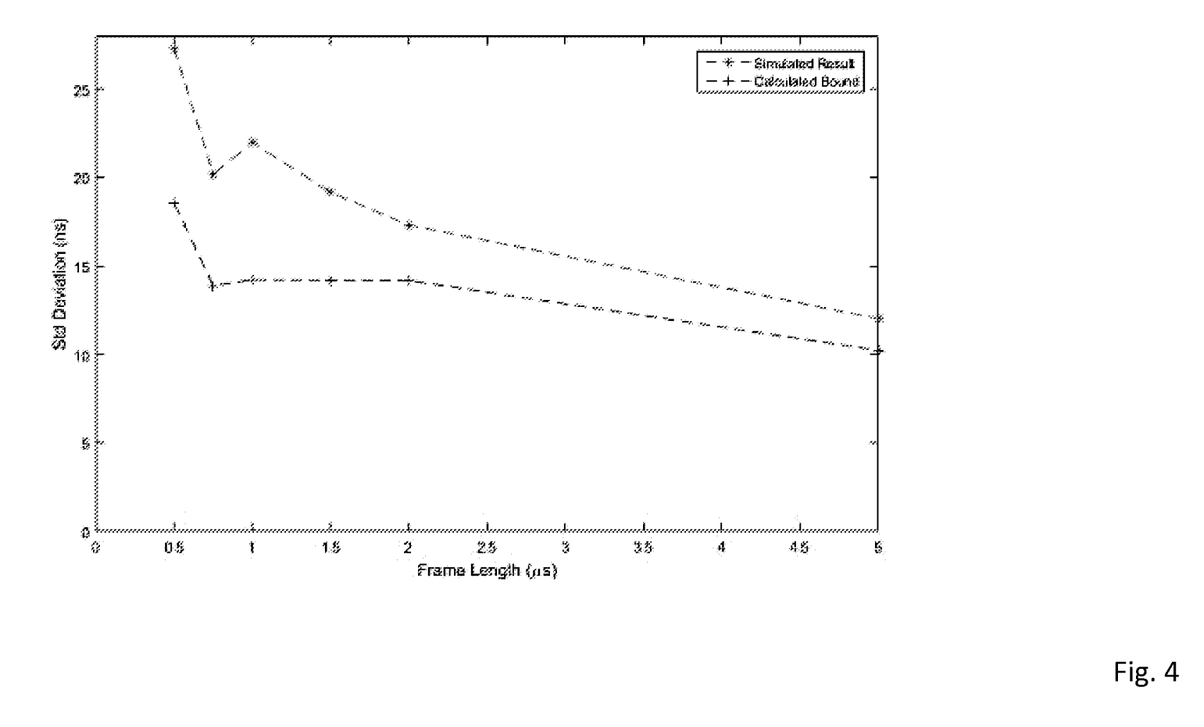
FIG. 4 is a diagram illustrating a simulated estimation error for relative delays and a calculated lower bound for varying values of frame length in a 200 node network in accordance with an illustrative embodiment.
Figure 5:
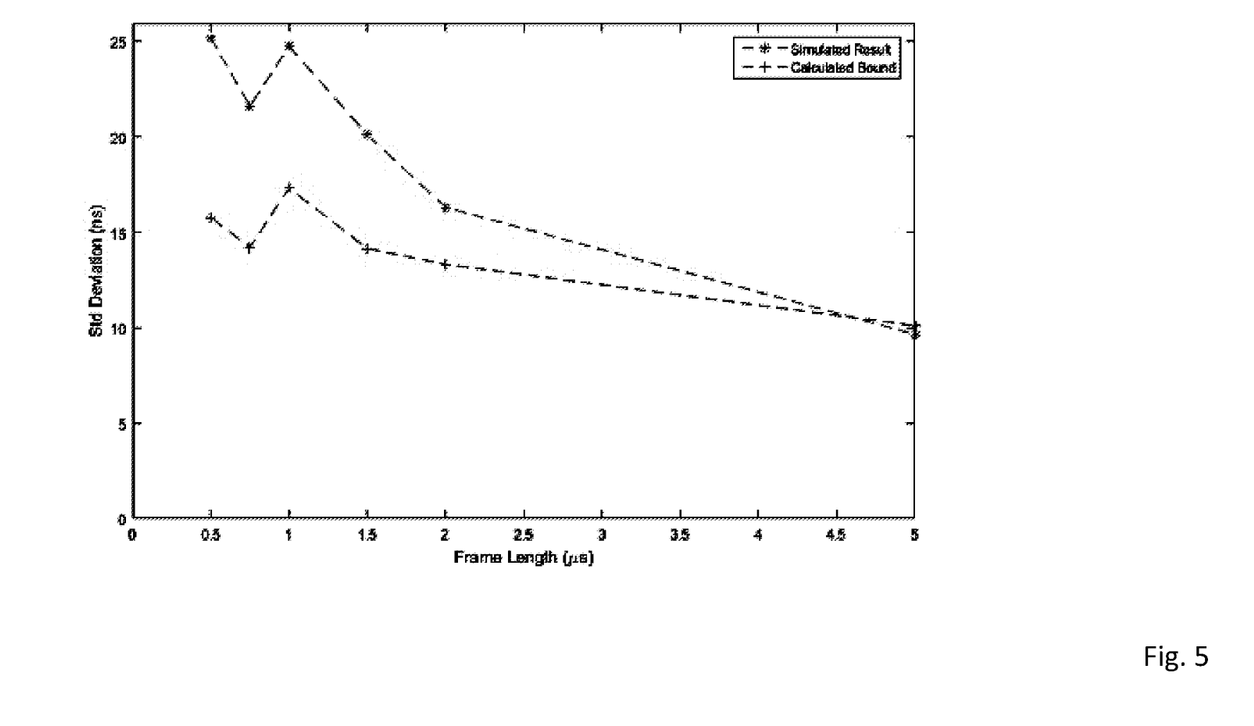
FIG. 5 is a diagram illustrating the simulated estimation error for the relative delays and the calculated lower bound for varying values of frame length in a 300 node network in accordance with an illustrative embodiment.
Figure 6:
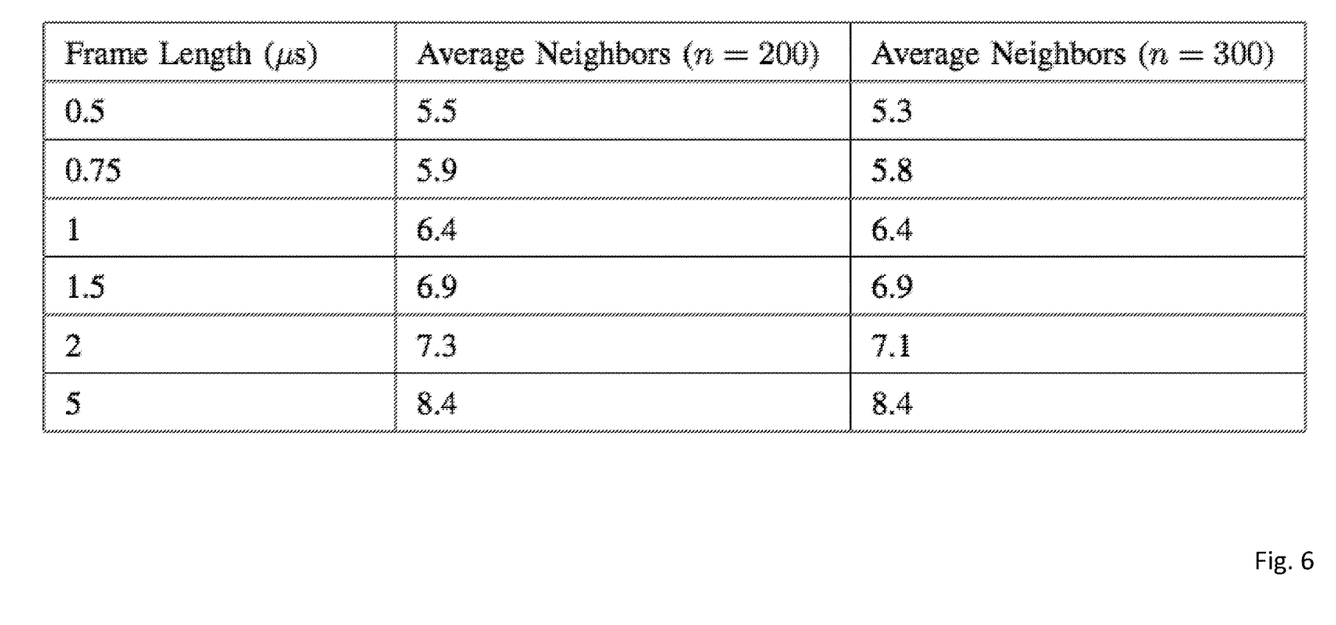
FIG. 6 is a table that displays the average number of neighbors for the simulations set forth in FIG. 4 and FIG. 5, in accordance with an illustrative embodiment.

First, the bound on the relative estimates was verified by simulating the relative delay estimate made. The same node topologies were used for the different frame lengths when the number of nodes was the same. FIG. 4 is a diagram illustrating the simulated estimation error for the relative delays and the calculated lower bound for varying values of frame length in a 200 node network in accordance with an illustrative embodiment. With reference to FIG. 4, the lower bound was calculated using Eq. 27 for varying values of the frame length T. FIG. 5 is a diagram illustrating the simulated estimation error for the relative delays and the calculated lower bound for varying values of frame length in a 300 node network in accordance with an illustrative embodiment. In both the simulations of FIG. 4 and FIG. 5, SIC was not used. From the results, it can be seen that the calculated bound does in fact provide a lower bound for the estimates in the initial frame, verifying the validity of Eq. 27. It is noted that, in the simulations, the average number of neighbors (i.e. estimates made) varies based on the frame length used. FIG. 6 is a table that displays the average number of neighbors for the simulations set forth in FIG. 4 and FIG. 5, in accordance with an illustrative embodiment.

The scheme was also tested by using the signals received in the initial frame in order to estimate which nodes are the strongest neighbors. Once this is done, the repetition frame is used to first estimate the delay to the strongest node. This signal is then canceled using SIC as discussed above. After canceling this term, the next step is to attempt to also cancel some non-direct terms out if appropriate. For example, there may be some strong interferers which are present at the receiving node which are repetitions of signals sent between two other nodes in the initial frame. As discussed above, the receiving node can estimate the relative delay between those nodes and therefore can still attempt to cancel such terms. Once this has been done for what the receiving node believes to be the strong non-direct terms (based on the strongest neighbor estimates of the initial frame), then the whole process is repeated for the next strongest direct delay, and so on.

The ranging processes described herein can be performed at any time interval, depending on the particular needs of the network. For example, in a network in which nodes are substantially stationary, ranging may only be performed once, or every several minutes, or based on an event such as when new nodes join the network. In a network in which nodes are more mobile, the ranging may be performed every second, every minute, or at any other interval. Also, it is to be understood that any of the operations described herein can be implemented as computer code stored on a computer-readable medium such as a computer memory for execution by a processor or processing device.

The systems and methods described above may be implemented in many different ways in many different combinations of hardware, software firmware, or any combination thereof. In one example, the systems and methods can be implemented with a processor and a memory, where the memory stores instructions, which when executed by the processor, causes the processor to perform the systems and methods. The processor may mean any type of circuit such as, but not limited to, a microprocessor, a microcontroller, a graphics processor, a digital signal processor, or another processor. The processor may also be implemented with discrete logic or components, or a combination of other types of analog or digital circuitry, combined on a single integrated circuit or distributed among multiple integrated circuits. All or part of the logic described above may be implemented as instructions for execution by the processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. A product, such as a computer program product, may include a storage medium and computer readable instructions stored on the medium, which when executed in an endpoint, computer system, or other device, cause the device to perform operations according to any of the description above. The memory can be implemented with one or more hard drives, and/or one or more drives that handle removable media, such as diskettes, compact disks (CDs), digital video disks (DVDs), flash memory keys, and other removable media.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above.

While various embodiments have been described, it can be apparent that many more embodiments and implementations are possible. Accordingly, the embodiments are not to be restricted.

What is claimed is:

1. A node in a wireless network, wherein the node comprises:
    a memory configured to store a signature of the node;
    a transceiver operatively coupled to the memory and configured to:
        transmit, during an initial frame, the signature of the node to one or more neighboring nodes;
        receive, during the initial frame, a first signal that includes one or more signatures of the one or more neighboring nodes;
        transmit, during a repetition frame, the first signal received during the initial frame; and
        receive, during the repetition frame, a second signal that includes a retransmission of signals received by the one or more neighboring nodes during the initial frame; and
    a processor operatively coupled to the memory and the transceiver, wherein the processor is configured to determine a distance from the node to each of the one or more neighboring nodes based at least in part on the first signal and the second signal.

2. The node of claim 1, wherein the processor is further configured to determine a distance between each of the one or more neighboring nodes based at least in part on the first signal and the second signal.

3. The node of claim 1, wherein the processor is further configured to determine a propagation delay between the node and each of the one or more neighboring nodes, and wherein the distance from the node to each of the one or more neighboring nodes is determined based at least in part on the propagation delay.

4. The node of claim 3, wherein the processor determines the propagation delay with a signal interference cancellation technique.

5. The node of claim 1, wherein the processor is further configured to scramble the first signal prior to transmission of the first signal during the repetition frame.

6. The node of claim 1, wherein the second signal received by the node during the repetition frame is scrambled, and wherein the processor is configured to descramble the second signal.

7. The node of claim 1, wherein the signature of the node is a function of a node identifier assigned to the node.

8. The node of claim 1, wherein the memory is further configured to store information regarding the signatures of each of the one or more neighboring nodes.

9. The node of claim 1, wherein the memory is further configured to store information regarding a scrambling sequence of each of the one or more neighboring nodes.

10. The node of claim 1, wherein the processor is configured to determine a received signal strength of each portion of the first signal, wherein each portion of the first signal is received from a different node of the one or more neighboring nodes.

11. The node of claim 10, wherein the processor determines the distance from the node to each of the one or more neighboring nodes based at least in part on the received signal strength of each portion of the first signal.

12. The node of claim 1, wherein the second signal that includes the retransmission of signals received by the one or more neighboring nodes during the initial frame comprises a superposition signal that includes a signal portion from each of the one or more neighboring nodes, and wherein the processor is configured to determine the signal portion received from each of the one or more neighboring nodes.

13. A method, comprising:
transmitting, by a transceiver of a node during an initial frame, a signature of the node to one or more neighboring nodes;
receiving, by the transceiver of the node during the initial frame, a first signal that includes one or more signatures of the one or more neighboring nodes;
transmitting, by the transceiver of the node during a repetition frame, the first signal received during the initial frame;
receiving, by the transceiver of the node during the repetition frame, a second signal that includes a retransmission of signals received by the one or more neighboring nodes during the initial frame; and
determining, by a processor of the node, a distance from the node to each of the one or more neighboring nodes based at least in part on the first signal and the second signal.

14. The method of claim 13, further comprising determining, by the processor of the node, a distance between each of the one or more neighboring nodes based at least in part on the first signal and the second signal.

15. The method of claim 13, further comprising determining a propagation delay between the node and each of the one or more neighboring nodes, and wherein determining the distance from the node to each of the one or more neighboring nodes is based at least in part on the propagation delay.

16. The method of claim 15, further comprising using a signal interference cancellation technique to determine the propagation delay.

17. The method of claim 13, further comprising scrambling, by the node, the first signal prior to transmission of the first signal during the repetition frame.

18. The method of claim 13, wherein the second signal received by the node during the repetition frame is scrambled, and further comprising descrambling the second signal by the node.

19. The method of claim 13, further comprising storing, in a memory of the node, information regarding a signature of each of the one or more neighboring nodes and information regarding a scrambling sequence of each of the one or more neighboring nodes.

20. The method of claim 13, wherein the second signal that includes the retransmission of signals received by the one or more neighboring nodes during the initial frame comprises a superposition signal that includes a signal portion from each of the one or more neighboring nodes, and further comprising determining, by the processor of the node, the signal portion received from each of the one or more neighboring nodes.

* * * * *